Patented Aug. 27, 1929.

1,726,252

UNITED STATES PATENT OFFICE.

RICHARD WOLFFENSTEIN, OF BERLIN-DAHLEM, GERMANY, ASSIGNOR TO I. G. FARBENINDUSTRIE AKTIENGESELLSCHAFT, OF FRANKFORT-ON-THE-MAIN, GERMANY.

COMPLEX COMPOUNDS OF AROMATIC PARADIAMINES WITH SULPHUR DIOXIDE AND PROCESS OF PREPARING SAME.

No Drawing. Application filed April 18, 1927, Serial No. 184,828, and in Germany April 17, 1926.

The present invention relates to complex compounds of aromatic paradiamines with sulphur-dioxide and a process of preparing the same.

Aromatic para-diamines which have a wide application in dyeing, for example in colouring dead or living hair, have also extended use as photographic developers. They suffer from the defect that they are very sensitive to oxidizing agents and are fundamentally changed even by air with a strong development of colour.

I have now found that new, valuable complex compounds of aromatic paradiamines with sulphur-dioxide are obtainable by treating the aromatic paradiamines with sulphur-dioxide while excluding water as completely as possible. My new compounds are quite stable and can be stored in the open air. They are easily soluble in cold water to a colorless solution, soluble in cold alcohol, difficultly soluble in acetone, and insoluble in ether, benzene, and chloroform. Their chemical structure has not yet been ascertained.

The following examples illustrate the invention, the parts being by weight:—

*Example 1.*—1 part of para-toluylene-diamine is dissolved in 4 parts of benzene and sulphur dioxide is passed into solution until the latter is saturated. There is precipitated a reddish brown compound which is filtered and exposed to air until the benzene has evaporated. There remains a pure white compound which can be kept without change. After being exposed to the air for about 24 hours it contains about 35.97% of sulphur-dioxide.

*Example 2.*—1 part of para-phenylene-diamine is dissolved in 20 parts of benzene and sulphur dioxide is passed through the solution until the latter is saturated therewith. The product is worked up as described in Example 1. After being exposed to the air for about 24 hours it contains about 32.06% of sulphur-dioxide.

What I claim is:

1. A manufacture of compounds of aromatic para-diamines with sulphur dioxide by treating an aromatic para-diamine with sulphur dioxide while excluding water.

2. A manufacture of compounds of aromatic para-diamines with sulphur dioxide which consists in dissolving an aromatic para-diamine in a solvent and passing sulphur dioxide through the solution while excluding water as completely as possible.

3. A manufacture of compounds of paradiamines of the benzene series with sulphur dioxide which consists in dissolving a para-diamine of the benzene series in a solvent and passing sulphur dioxide through the solution while excluding water as completely as possible.

4. A manufacture of a compound of para-toluylenediamine with sulphur dioxide which consists in dissolving para-toluylenediamine in a solvent and passing sulphur dioxide through the solution while excluding water as completely as possible.

5. A manufacture of a compound of para-toluylenediamine with sulphur dioxide which consists in dissolving para-toluylenediamine in benzene and passing sulphur dioxide through the solutions while excluding water as completely as possible.

6. As new products complex compounds of aromatic para-diamines with sulphur dioxide which are easily soluble in water, quite stable when exposed to the air and capable of being stored in the open air, said new products being substantially identical with those obtainable by reacting aromatic para-diamines upon sulphur dioxide while excluding water as completely as possible.

7. As new products complex compounds of para-diamines of the benzene series with sulphur dioxide which are easily soluble in water, quite stable when exposed to the air and capable of being stored in the open air, said new products being substantially identical with those obtainable by reacting para-diamines of the benzene series upon sulphur dioxide while excluding water as completely as possible.

8. As a new product the complex compounds of para-toluylenediamine with sulphur dioxide being in the dry state a pure white powder easily soluble in water and not losing sulphur dioxide on exposure to the air, said new product being substantially identical with that obtainable by reacting para-toluylenediamine upon sulphur dioxide while excluding water as completely as possible.

In testimony whereof I affix my signature.

RICHARD WOLFFENSTEIN.